(12) United States Patent
Henson et al.

(10) Patent No.: US 10,507,425 B2
(45) Date of Patent: Dec. 17, 2019

(54) IONIC LIQUID CO2 SCRUBBER FOR SPACECRAFT

(71) Applicant: HONEYWELL INTERNATIONAL INC., Morris Plains, NJ (US)

(72) Inventors: Phoebe Henson, Scottsdale, AZ (US); Stephen Yates, South Barrington, IL (US); Dacong Weng, Rancho Palos Verdes, CA (US); Alexander Bershitsky, Northbrook, IL (US); Ted Bonk, Cave Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 297 days.

(21) Appl. No.: 15/422,166

(22) Filed: Feb. 1, 2017

(65) Prior Publication Data

US 2018/0056233 A1    Mar. 1, 2018

Related U.S. Application Data

(60) Provisional application No. 62/382,854, filed on Sep. 2, 2016, provisional application No. 62/378,863, filed on Aug. 24, 2016.

(51) Int. Cl.
*B01D 53/14* (2006.01)
*B01D 53/18* (2006.01)
*B64G 1/48* (2006.01)

(52) U.S. Cl.
CPC ......... *B01D 53/18* (2013.01); *B01D 53/1425* (2013.01); *B01D 53/1475* (2013.01); *B64G 1/48* (2013.01); *B01D 2252/30* (2013.01); *B01D 2257/708* (2013.01); *B01D 2259/4575* (2013.01); *Y02C 10/06* (2013.01)

(58) Field of Classification Search
CPC .......... B01D 2252/30; B01D 2257/708; B01D 2259/4575; B01D 53/1425; B01D 53/1475; B01D 53/18; B64G 1/48; Y02C 10/06

See application file for complete search history.

(56) References Cited

U.S. PATENT DOCUMENTS

| | | |
|---|---|---|
| 2,941,872 A | 6/1960 | Pilo et al. |
| 3,632,519 A | 1/1972 | Gustafson |
| 4,015,960 A | 4/1977 | Nutter |

(Continued)

OTHER PUBLICATIONS

Stephen F. Yates et al., "Direct Liquid Contact—Next Generation Approach to Combined CO2 Recovery and Humidity Control for Extended Missions", AIAA Space 2016, AIAA Space Forum, (AIAA 2016-5462).

(Continued)

*Primary Examiner* — Cabrena Holecek
(74) *Attorney, Agent, or Firm* — Shimokaji IP (57) ABSTRACT

An environmental control system includes an air conditioning subsystem; a mix manifold downstream of the air conditioning subsystem and upstream of an environment to be conditioned; and a contaminant removal subsystem downstream of the environment to be conditioned. The contaminant removal subsystem includes a first gas-liquid contactor-separator. The first gas-liquid contactor-separator includes a first packed, stationary bed that provides a heat/mass transfer surface for contact between a contaminated air from the environment and a liquid absorbent.

6 Claims, 9 Drawing Sheets

(56) References Cited

U.S. PATENT DOCUMENTS

| | | |
|---|---|---|
| 4,217,237 A | 8/1980 | Sartori et al. |
| 4,285,918 A | 8/1981 | Gustafson |
| 4,382,045 A | 5/1983 | Wem |
| 4,692,283 A | 9/1987 | Wem et al. |
| 5,145,314 A | 9/1992 | Westhoff, Jr. et al. |
| 5,318,758 A | 6/1994 | Fujii et al. |
| 5,332,501 A | 7/1994 | Mangialardi |
| 6,364,940 B1 | 4/2002 | Prueter et al. |
| 6,627,166 B1 | 9/2003 | Simon |
| 7,252,703 B2 | 8/2007 | MacKnight |
| 7,429,299 B2 | 9/2008 | McGlinchy et al. |
| 7,527,775 B2 | 5/2009 | Chinn et al. |
| 7,662,220 B2 | 2/2010 | Fukano et al. |
| 7,905,360 B2 | 3/2011 | Della Casa |
| 8,167,979 B2 | 5/2012 | Hintz |
| 8,790,445 B2 | 7/2014 | Gu et al. |
| 8,952,193 B2 | 2/2015 | Davis, Jr. |
| 8,974,567 B2 | 3/2015 | Verdegan et al. |
| 9,028,785 B2 | 5/2015 | Kortunov et al. |
| 9,168,475 B2 | 10/2015 | Carlos et al. |
| 9,186,617 B2 | 11/2015 | Calabro et al. |
| 9,186,618 B2 | 11/2015 | Baugh et al. |
| 9,339,757 B2 | 5/2016 | Jayaweera et al. |
| 2013/0071307 A1* | 3/2013 | Engelke ............. B01D 19/0057 423/220 |
| 2013/0305924 A1* | 11/2013 | Nakamura ......... B01D 53/1425 95/162 |
| 2014/0290486 A1 | 10/2014 | Todd, IV et al. |
| 2015/0023807 A1 | 1/2015 | Cherry et al. |

OTHER PUBLICATIONS

Liang-Liang Zhang et al., "Absorption of Carbon Dioxide with Ionic Liquid in a Rotating Packed Bed Contactor: Mass Transfer Study", Industrial & Engineering Chemistry Research, American Chemical Society, 2011, 50, pp. 6957-6964.

* cited by examiner

| PROPERTY | VALUE | TEMPERATURE/WATER CONCENTRATION |
|---|---|---|
| MOLECULAR WEIGHT (g/mol) | 198.26 | |
| DENSITY (g/mL) | 1.055 | 25°C/ANHYDROUS |
| SURFACE TENSION (mN/m) | 36.4 | 25°C/ANHYDROUS |
| HEAT CAPACITY (J/mol/°K) | 210 | 25°C/ANHYDROUS |
| ONSET OF THERMAL DEGRADATION (°C) | 216 | |
| VISCOSITY (mPa·s) | 406 | 30°C/ANHYDROUS |
| | 263 | 30°C/2% WATER |
| | 152 | 30°C/5.5% WATER |
| | 111 | 50°C/ANHYDROUS |
| | 79 | 50°C/2% WATER |
| | 52 | 50°C/5.5% WATER |

FIG. 4
TABLE 1

IONIC LIQUID CO2 SCRUBBER FOR SPACECRAFT

BACKGROUND OF THE INVENTION

The present invention generally relates to contaminant removal and, more particularly, to apparatus and methods of contaminant removal employing gas-liquid contact and separation.

It is of great interest to control and limit the concentration of carbon dioxide in occupied spaces, including homes, buildings, transportation vehicles, aircraft and spacecraft. Higher concentrations of carbon dioxide in the air are uncomfortable, and studies have shown that the ability of individuals to concentrate or make correct decisions is impaired. It is particularly important to control carbon dioxide concentrations in enclosed vehicles like aircraft or spacecraft. In aircraft, fresh air enters the occupied space as bleed air from the engine, and results in increased fuel consumption. In spacecraft, no fresh air is available, and the cabin air must be preserved in a healthful condition. For aircraft, the FAA limits the acceptable concentration of carbon dioxide to 5000 ppm, while aircraft currently have 1500-2300 ppm. Decreasing the bleed air flow would improve fuel efficiency, but would require a technology to remove carbon dioxide from the air.

High levels of carbon dioxide in the International Space Station (ISS) are resulting in headaches, fatigue and eye degeneration in astronauts. Deep Space Missions lengthen crew exposure to these conditions. Therefore, CO2 removal systems for next generation deep space vehicles are required to maintain a much lower CO2 partial pressure. In addition, deep space vehicles are required to have a lower size, weight, power, and thermal load, and use fewer consumables, while fixing existing safety problems that are apparent in current systems. The maintenance interval of current systems (three to six months) is also required to jump to three years.

Long duration, deep space missions require a more advanced life support system than that used on shorter missions or on the ISS.

Carbon dioxide recovery is a critical component of the air revitalization system for such missions. Carbon dioxide must be removed from the vessel atmosphere and maintained below 2 torr to preserve crew health, and maintain alertness and comfort. This carbon dioxide should not be discarded to space, as it was in shorter missions or as it often is on the ISS, but should instead be converted to oxygen and carbon in order for the oxygen to be recycled back to the cabin. Any significant loss in carbon dioxide entails increases in the amount of oxygen or water required to be brought with the mission. For missions to Mars, some plans include landing on the planet and remaining there for eighteen months, during which the Mars Transfer Habitat remains in Mars orbit, unoccupied. The life support system would remain in an operational ready state during this period able to resume operation with high reliability for the return flight quickly.

As can be seen, there is a need for improved apparatus and methods to remove contaminants from a supply air in environments such as deep space vehicles.

SUMMARY OF THE INVENTION

In one aspect of the present invention, an environmental control system comprises an air conditioning subsystem; a mix manifold downstream of the air conditioning subsystem and upstream of an environment to be conditioned; a contaminant removal subsystem downstream of the environment to be conditioned; wherein the contaminant removal subsystem includes a first gas-liquid contactor-separator; and wherein the first gas-liquid contactor-separator includes a housing and a first packed bed that is stationary relative to the housing, wherein the first gas-liquid contactor-separator provides a heat/mass transfer surface for contact between a contaminated air from the environment and a liquid absorbent.

In another aspect of the present invention, a contaminant removal subsystem comprises a scrubber that includes a housing and a packed bed that is non-rotating relative to the housing; wherein the scrubber receives a contaminated air and a clean liquid absorbent, and discharges a cleaned air and a used liquid absorbent; wherein the cleaned air contains a lower concentration of gas contaminant than the contaminated air; wherein the used liquid absorbent includes gas contaminant absorbed into clean liquid absorbent; a stripper downstream of the scrubber; wherein the stripper desorbs gas contaminant from the used liquid absorbent to produce a regenerated liquid absorbent.

In a further aspect of the present invention, a gas-liquid contactor and separator comprises an inlet that discharges a first flow of contaminated air having a gas contaminant; a nozzle that discharges a second flow of droplets of clean liquid absorbent; wherein the first and second flows are co-current to one another; a first packed, stationary bed that is configured to: contact, without the need for gravity, clean liquid absorbent with contaminated air; transfer, without the need for gravity, gas contaminant to clean liquid absorbent to thereby produce a used liquid absorbent and a cleaned air.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention can be integrated into environments such as spacecraft used in long-duration missions, specifically, space stations and spacecraft and habitats used in and beyond low earth orbit, as the invention, particularly gas-liquid separation, operates independent of gravity. The present invention may also be used for aircraft, as another example, where its gravity independence would help mitigate failures due to managing liquids under turbulence.

The present invention may be part of an environmental control system. The present invention can provide a contaminant (e.g., CO2) removal subsystem that may interface with an upstream temperature and humidity control device which interfaces with an environment for occupants, such as a cabin. Downstream of this removal subsystem, water may be stored for water processing, whereas a contaminant outlet may interface with a contaminant reduction subsystem. It will be understood by those skilled in the art that incorporation of a contaminant removal subsystem into an integrated environmental control system will be desirable in some applications, including aircraft cabins, but for other applications, the subsystem may be operated as an independent unit, or integrated with other subsystems which convert carbon dioxide into oxygen and other byproducts.

The contaminant removal subsystem of the present invention can use a liquid-based architecture, ionic liquid contaminant absorbents, spray gas-liquid contactors, and/or centrifugal separators to provide performance, reliability, and safety, while lowering the size, weight, power, thermal load and amount of consumables needed. In addition, the present invention can aid with humidity removal, temperature control and trace gas contamination removal.

In various embodiments, the present invention may include a liquid-based contaminant (e.g., CO2) removal architecture having: 1) an ionic liquid(s) having a high contaminant loading capacity and a high rate of absorption; 2) a contactor(s) such as a spray contactor, a static mixer, and/or a packed bed; and 3) a separator(s) to provide gas-liquid separation, all of which can provide gravity independent operation. In embodiments, the contactor and separator may be integrated as a single component.

US patent application entitled "Apparatus and Methods for Enhancing Gas-Liquid Contact/Separation" filed concurrently with this application is incorporated herein by reference as though fully set forth herein.

Herein, the term "absorbent" is intended to generally include absorbents and/or adsorbents.

Figure 1:
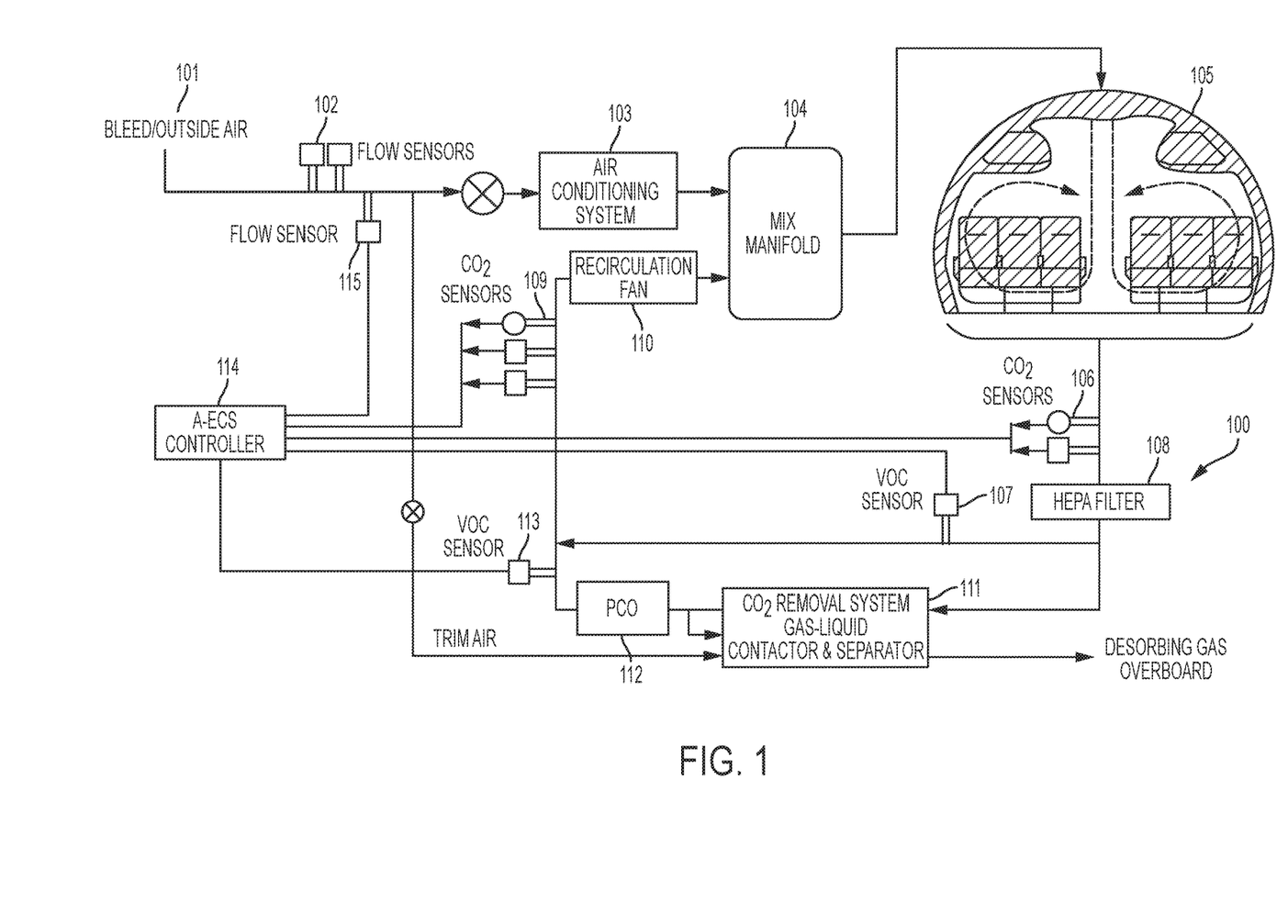
FIG. 1 is a schematic diagram of an environmental control system (ECS) in accordance with an exemplary embodiment of the invention.

FIG. 1 is a schematic diagram of an exemplary embodiment of an environmental control system (ECS) 100 according to the present invention. The ECS 100 may receive an outside air 101 which, for example, may be a bleed air when the ECS 100 is implemented for an aircraft. The outside air 101 may flow to one or more sensors 102 that may sense characteristics of the outside air 101, such as temperature and/or humidity.

From the one or more sensors 102, the outside air 101 may flow to one or more sensors 115 that may sense characteristics of the air 101 such as temperature, pressure and/or humidity. Once past the sensor(s) 115, the outside air 101 may be conditioned by an air conditioning subsystem 103, which conditioning may include temperature, pressure and/or humidity.

Conditioned air may flow from the air conditioning subsystem 103, through a mix manifold 104, and into an environment 105 to be conditioned. The environment 105 may be an enclosed area for occupants, such as a cabin of an aircraft. In the environment 105, the conditioned air may acquire contaminants, such as from occupants in the environment 105, and produce a contaminated air.

Upon exiting the environment 105, the contaminated air may be sensed by one or more gas contaminant sensors 106. The sensor(s) 106 may sense one or more gas contaminants, such as CO2. Once past the sensor(s) 106, the contaminated air may be filtered by a filter 108. A part of filtered air from the filter 108 may then be sensed by one or more VOC sensor(s) 107 that may sense one or more volatile organic compounds (VOCs). After the sensor(s) 107, the part of a filtered air from the filter 108 may move into a recirculation fan 110. From the recirculation fan 110, the filtered air may be forced into the mix manifold 104 where the filtered air can be mixed with the conditioned air from the air conditioning subsystem 103.

Instead of and/or in addition to the filtered air moving through the fan 110, a part of filtered air from the filter 108 may move through a contaminant removal subsystem 111. The removal subsystem 111 may remove one or more gas contaminants sensed by the one or more sensors 106. The contaminant removal subsystem 111 may, in various embodiments, include one or more gas-liquid contactor and separators, such as those described below, to effectuate removal of gas contaminants. However, the present invention envisions that gas-liquid contactor and separators, other than those described below, can be employed.

Within the contaminant removal subsystem 111, a used liquid absorbent may be produced. "Used liquid absorbent" means "clean liquid absorbent" that has absorbed gas contaminant(s). "Clean liquid absorbent" means liquid absorbent that is substantially free of absorbed gas contaminant(s).

Also within the contaminant removal subsystem 111, a regenerated liquid absorbent may be produced. "Regenerated liquid absorbent" means used liquid absorbent that has undergone desorption of gas contaminant(s).

Additionally within the contaminant removal subsystem 111, a cleaned air may be produced. "Cleaned air" means air that has an insubstantial amount of gas contaminant(s) and/or H2O. In embodiments, "cleaned air" has a gas contaminant(s) and/or H2O concentration less than that of the outside air 101 and/or less than that of the contaminated air from the environment 105.

Cleaned air from the subsystem 111 may flow into a photocatalytic oxidizer (PCO) 112 to remove one or more VOCs and thereby produce a further cleaned air. One or more VOC sensors 113 may be downstream of the PCO 112. One or more gas contaminant sensors 109, such as CO2 sensor(s), can be downstream of the VOC sensor(s) 113. The further cleaned air flow can then flow into the fan 110, and then into a mix manifold 104 where it can be mixed with conditioned air from the air conditioning subsystem 103.

Instead of and/or in addition to flowing through the PCO 112, a part of cleaned air (e.g., <10%) from the contaminant removal subsystem 111 may recirculate back into the subsystem 111 for additional processing such as desorption of gas contaminant(s) from used liquid absorbent, and regeneration of clean liquid absorbent, as further described below.

A controller 114 may be in communication with one or more of the sensors 106, 109, 113, 115 for control over one or more components of the ECS 100, such as fan(s) and/or and valve(s) (not all of which may be shown in FIG. 1).

Figure 2A:
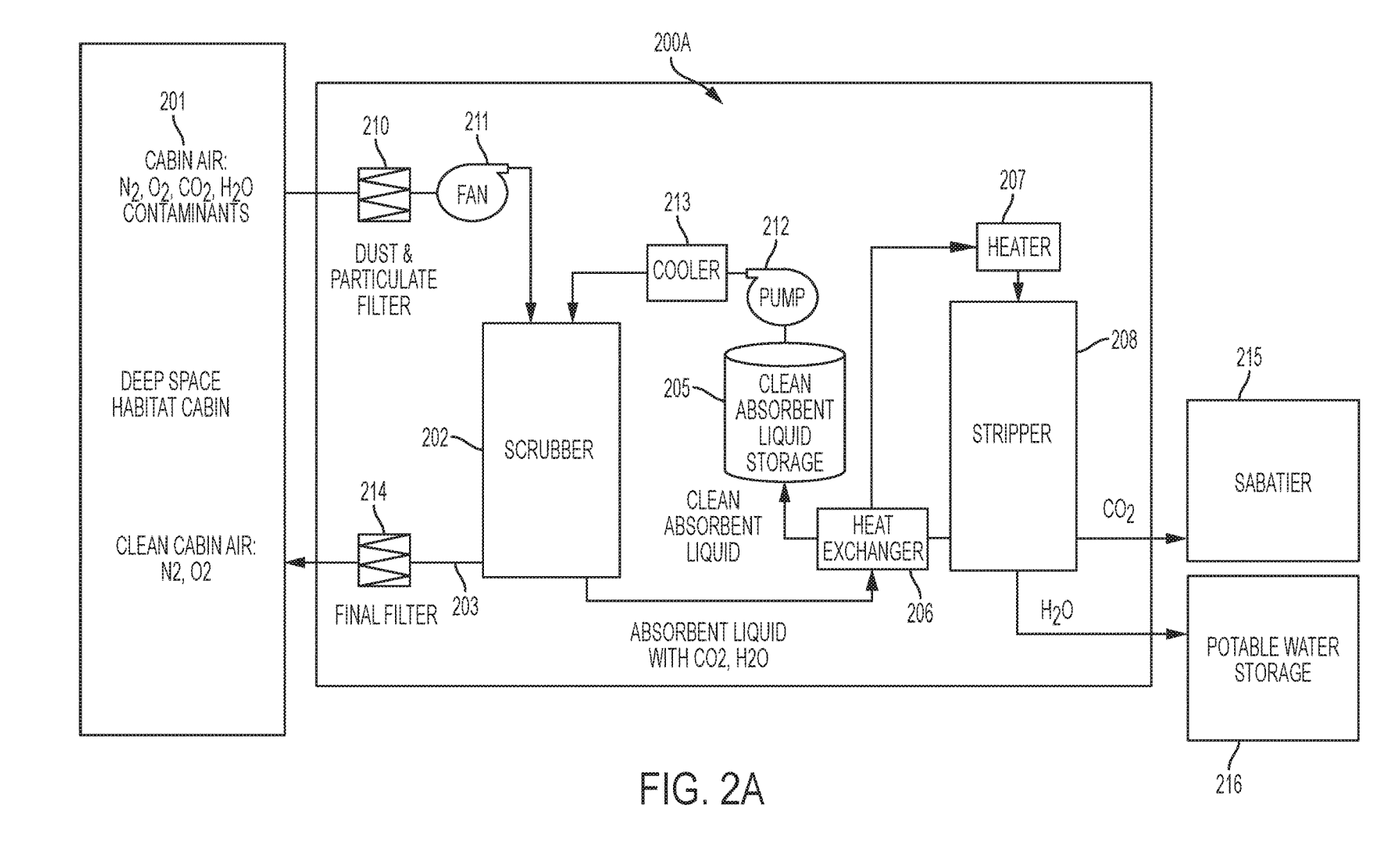
FIG. 2A is a schematic diagram of a closed-loop carbon dioxide removal system in accordance with an exemplary embodiment of the invention.

FIG. 2A is a schematic diagram of an exemplary contaminant removal subsystem (i.e., closed-loop air revitalization subsystem) 200A that may be employed in the aircraft ECS 100 above and/or in a space-based systems. However, other contaminant removal subsystems may be employed. A "closed-loop air revitalization subsystem" is intended to mean a subsystem which recovers valuable resources from waste products, such as recovering valuable oxygen molecules from waste carbon dioxide. The subsystem 200A may include one or more gas-liquid contactor and separators to effectuate removal of gas contaminant(s), such as those described below. However, the subsystem 200A is not limited to the contactor and separators described below.

The contaminant removal subsystem 200 may receive a contaminated air 201 from an environment, such as a spacecraft cabin. The contaminated air 201 may include one or more gas contaminants such as $CO_2$, and/or $H_2O$, and the air 201 may flow into a first gas-liquid contactor (i.e., scrubber) 202. In embodiments, the contaminated air 201 may, before entering the scrubber 202, be filtered for dust and particulates, via a filter 210, as well as being forced, via a fan 211, into the scrubber 202.

Concurrent with, or sequentially with, the scrubber 202 receiving the contaminated air 201, a clean liquid absorbent may be pumped, via a pump 212, into the scrubber 202, from a clean liquid absorbent storage 205. In embodiments, the liquid absorbent may be one or more ionic liquids described below.

Before entering the scrubber 202, the clean liquid absorbent may be cooled by a cooler 213 disposed between the pump 212 and the scrubber 202.

The scrubber 202 may contact the incoming contaminated air 201 with clean liquid absorbent in such a way that efficient mass and heat transfer can occur, as understood by those skilled in the art, such as by increasing the interfacial surface area between the gas and liquid phases, and efficient mixing. A liquid absorbent having absorbed gas contaminant(s) (i.e., a "used liquid absorbent") may be produced. The used liquid absorbent may also include $H_2O$ and/or VOCs.

From the scrubber-separator 202 cleaned air 203 may optionally flow through a filter 214, thereby producing a further cleaned air that can flow back to the environment to be conditioned. In embodiments, the cleaned air 203 may have a gas contaminant(s) concentration, and/or $H_2O$ concentration lower than that of the contaminated air 201.

Also from the scrubber-separator 202 used liquid absorbent may exit. The used liquid absorbent may flow into a heat exchanger 206. Therein, the used liquid absorbent may be heated by a regenerated liquid absorbent described below, and next flow into a heater 207 wherein the used liquid absorbent may be further heated. Alternatively, in the context of an aircraft, the used liquid absorbent may be heated by trim air.

From the heater 207, a heated, used liquid absorbent may flow into a second gas liquid contactor 208 (i.e., stripper) 208. The stripper 208 may have the same design as the scrubber 202, or a different design. In the context of an aircraft, the stripper 208 may also be used to discharge (i.e., not recirculate) carbon dioxide and/or water which can be transferred to the trim air.

The stripper 208 may produce therein a mist of or droplets of the heated, used liquid absorbent. The stripper 208 can enable desorption of gas contaminant(s) and/or $H_2O$ from heated, used liquid absorbent, and thereby produce regenerated liquid absorbent.

From the stripper 208, a regenerated liquid absorbent may exit. In embodiments, a gas contaminant concentration in the regenerated liquid absorbent is lower than that of the used liquid absorbent. The regenerated liquid absorbent may flow into the heat exchanger 206 wherein the regenerated liquid absorbent may be cooled by used liquid absorbent.

Concurrent with the stripper 208 outflowing the regenerated liquid absorbent, the stripper 208 may outflow gas contaminant(s), such as $CO_2$, and/or $H_2O$. In embodiments, the $CO_2$ and/or $H_2O$ may be recovered and reused, such as by a Sabatier reactor 215 and by a water storage 216, respectively. A Sabatier reactor functions by reacting the carbon dioxide with hydrogen to convert it to methane and water. The water, in turn, may be electrolyzed to generate hydrogen and oxygen, forming a closed-loop air revitalization system.

Figure 2B:
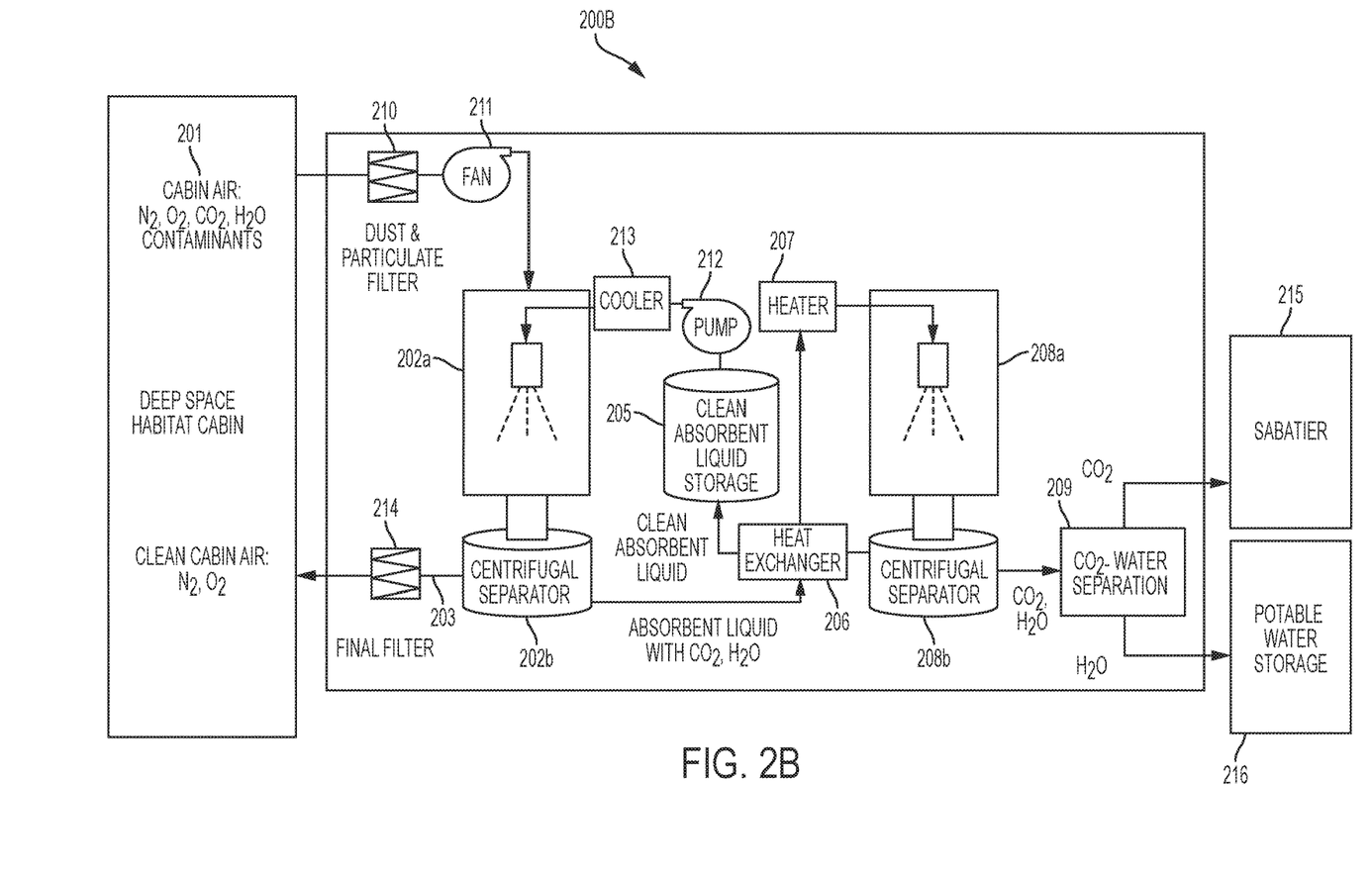
FIG. 2B is a schematic diagram of another closed-loop air carbon dioxide removal system in accordance with an exemplary embodiment of the invention.

FIG. 2B is a schematic diagram of another exemplary contaminant removal subsystem 200B that may be employed in the ECS 100 above and/or in gravity-independent systems. However, other contaminant removal subsystems may be employed. The subsystem 200B may include one or more gas-liquid contactor and separators to effectuate removal of gas contaminant(s), such as those described below. However, the subsystem 200B is not limited to the contactor and separators described below.

The embodiment of FIG. 2B is generally the same as the embodiment of FIG. 2A, except that the embodiment of FIG. 2B employs a scrubber 202a, a centrifugal separator 202b, rather than the scrubber 202 of FIG. 2A. And the embodiment of FIG. 2B employs a stripper 208a, a centrifugal separator 208b, and water separator 209, rather than the stripper 208 of FIG. 2A.

In embodiments, the stripper-separator 208a, b can have the same design as the scrubber-separator 202a, b.

Figure 3A:
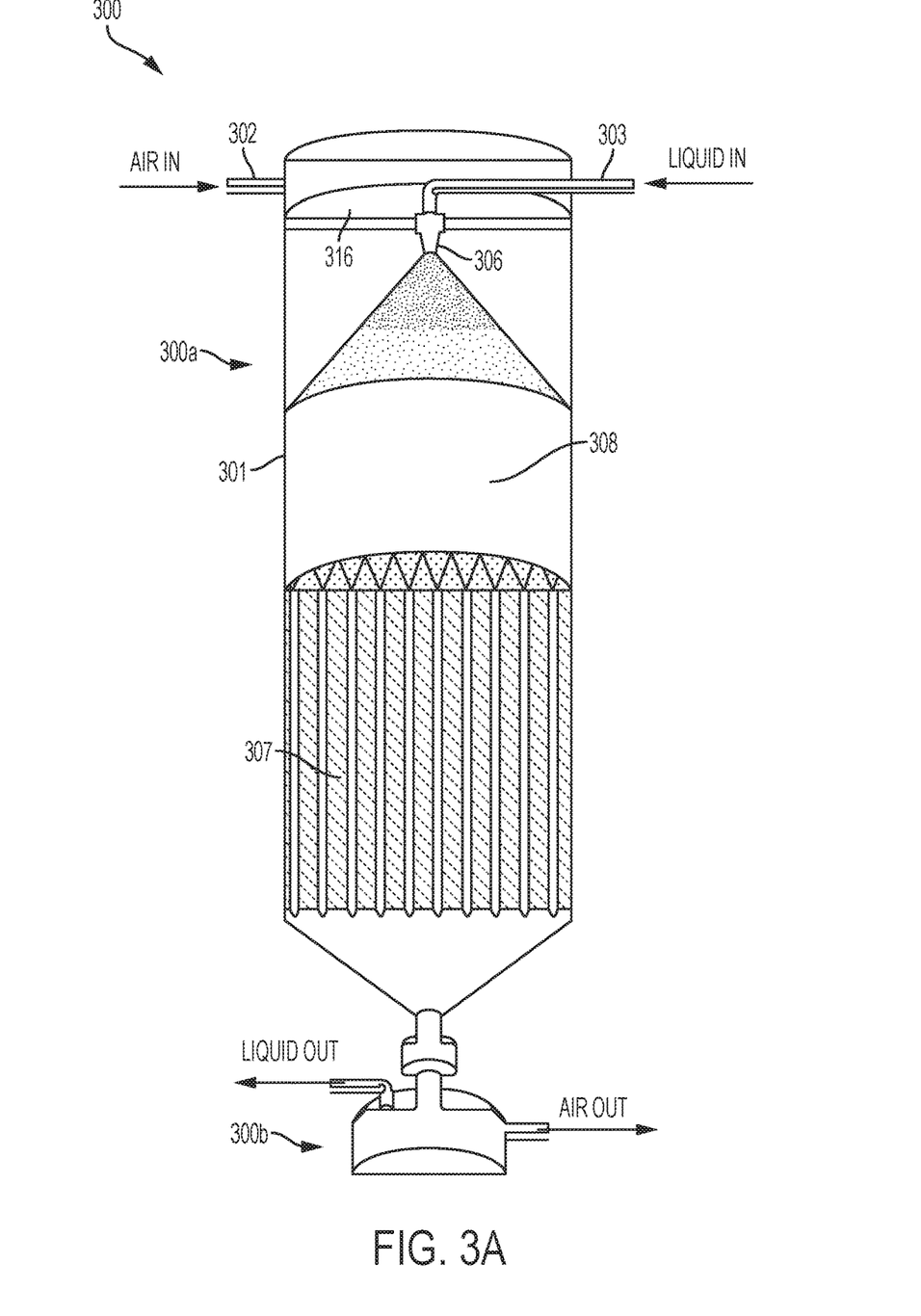
FIGS. 3A-3B are cross-sectional views of gas-liquid contact separators according to two embodiments of the present invention.

FIG. 3A shows an exemplary embodiment of the scrubber-separator 202a, b and/or stripper-separator 208a, b. For ease of discussion, the scrubber-separator 202a, b and stripper-separator 208a, b will be referred to as a "contactor-separator" 300. In this exemplary embodiment, the functions of gas-liquid contact and gas-liquid separation are achieved by two separate components 300a, b. In embodiments, the contactor-separator 300 is gravity independent for gas-liquid contact and/or separation.

The contactor 300a may include a housing 301 that may be cylindrical in configuration. At a first side of the housing is a contaminated air inlet 302, and, at a second side thereof is a clean liquid absorbent inlet 303. In embodiments, the inlets 302, 303 may be at first distal end of the contactor 300a. At a second and opposite distal end of the contactor 300a may be a used liquid absorbent outlet 315 that may expel used liquid absorbent in a flow generally perpendicular to the contaminated air flow and liquid absorbent flow.

Figure 3B:
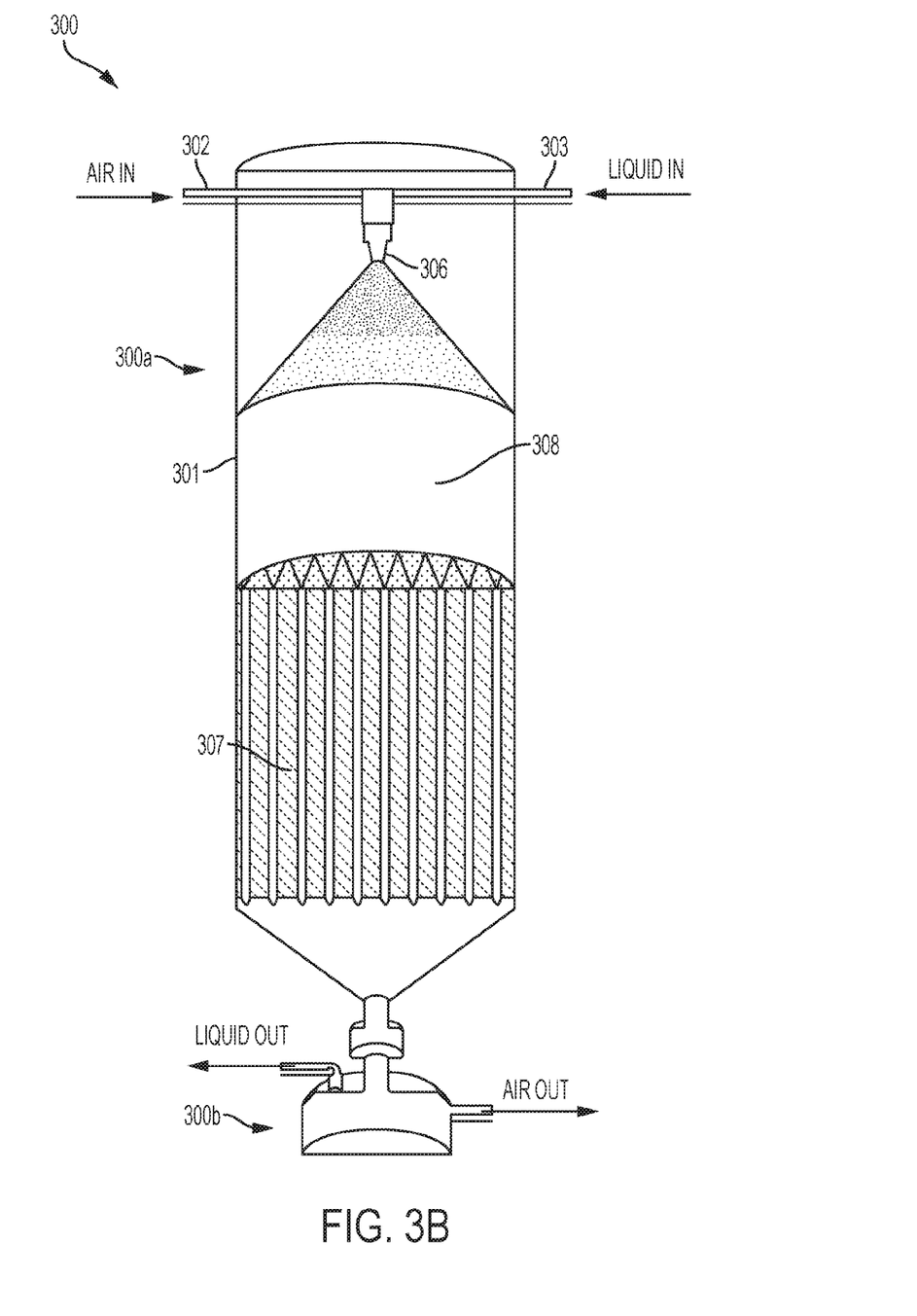

In FIG. 3A, the contaminated air, upon entering the housing 301 may flow through an air distributor 316. The distributor 316 has a generally porous configuration and functions to evenly distribute the contaminated air, within the housing 301, from the first distal end thereof and towards the second distal end thereof. Alternatively, in FIG. 3B, the contaminated air does not flow through a distributor and instead flows directly into a liquid spray nozzle 306. Thereby, the force of the air can be used to atomize, in the nozzle, liquid absorbent coming from the inlet 303.

Referring back to FIG. 3A, within or immediately proximate to the air distributor 316 (such as at/near the center thereof) can be a liquid spray nozzle 306 that can create a mist or spray of clean liquid absorbent droplets, such as by ultrasound that vibrates the nozzle. In embodiments, a flow of contaminated air from the distributor 316 and a flow of clean absorbent droplets from the nozzle 306 may flow in substantially the same direction, i.e., co-currently.

In embodiments, contaminated air may flow out of the inlet 302 at a pressure of from between about 12 to about 16 psia. In embodiments, clean liquid absorbent may flow out of the inlet 303 at a pressure of from between about 20 to about 60 psia.

In embodiments, the nozzle 306 may produce a spray or droplet pattern in a conical configuration for gas liquid contact.

A packed bed 307 may interface the nozzle 306. In embodiments, the bed is non-rotating and stationary within and relative to the housing 301. In embodiments, a distance between the bed 307 and the nozzle 306 may be between about 2 to about 6 inches or more.

Between the nozzle 306 and the packed bed 307 may be a mixing and/or contact area 308 where droplets of clean liquid absorbent may mix with and/or contact contaminated air. In embodiments, the liquid absorbent droplets and the contaminated air may, before reaching the bed 307, be in the contact area 308 during a contact time. Such contact may produce droplets of used liquid absorbent. In embodiments, the contact area 308 may have a circumference substantially equal to a circumference of the packed bed 307.

In embodiments, the bed 307 may be made of a material which is wetted by the ionic liquid, such as glass fibers, stainless steel mesh, stainless steel fibers, structured metallic supports, and ceramic beads. In embodiments, the packed bed 307 may provide a heat/mass transfer surface for contact among the droplets of used liquid absorbent formed in the contact area 308.

The bed also acts as a coalescing filter. In a coalescing filter, the tiny mist droplets impinge on the packing, and coalesce with each other by forming a film on the surface of the packing which then breaks off to form larger droplets. This is important since a centrifugal separator will not be able to separate air from a fine mist. The mist can be converted into larger droplets or even a continuous liquid phase entering the centrifugal separator. To accomplish this, the ionic liquid should be able to wet the packing, and the packing must be a good enough filter to intercept the mist. This will translate into requirement around packing element dimension and packing density. Coalescence is described in Yates et. al., "Direct Liquid Contact—Next Generation Approach to Combined CO2 Recovery and Humidity Control for Extended Missions," AIAA SPACE 2016, AIAA SPACE Forum, (AIAA 2016-5462)(http://dx.doi.org/10.2514/6.2016-5462), which is incorporated herein in its entirety.

Further, in embodiments, the bed 307 may provide a heat/mass transfer surface for separation of gas contaminant from contaminated air by virtue of clean liquid absorbent droplets absorbing gas contaminant in the contaminated air. Used liquid absorbent may be thereby produced.

However, the present invention is not intended to be limited by the above theories of operation.

Used liquid absorbent and/or contaminated air and/or contaminant gas that has separated from contaminated air may exit the bed 307 via the outlet 315. From the outlet 315, contaminant gas and/or contaminated air and/or used liquid absorbent may enter a centrifugal separator 317. Separated cleaned air (which may contain contaminated gas) and separated used liquid absorbent (which may contain CO2 and/or H2O) may exit the separator 317.

Since the chosen absorbent may also remove water, the contactor-separator can control humidity of the air stream.

In embodiments, many contaminants, including ammonia and acid gases, can also be removed by the liquid absorbent. Additional contaminants such as volatile organic compounds may also be removed if they are soluble in the liquid absorbent. For volatile organic compounds that are not soluble in the liquid absorbent, a photocatalytic oxidizer (PCO) can be included upstream from the contactor-separator to eliminate them. The contactor-separator also separates the liquid absorbent from clean air and allows the clean air to be returned to the environment to be conditioned. This clean air may pass through a final filter to ensure that no trace liquid absorbent or particles escapes the system.

According to the present invention, the liquid absorbent can meet a demanding set of criteria. The liquid can be safe and nontoxic to humans, and may not contaminate the purified air with odors or organic vapors. It may absorb carbon dioxide at the partial pressure expected during the mission, and may not lose performance when simultaneously absorbing water. It may also be regenerable without the use of space vacuum, so as not to lose CO2 and water to space, and regenerable without using excessive temperatures or power. The liquid may be durable and last without deterioration for the life of the mission.

The liquid absorbent can be one or more ionic liquids. They are salts, generally comprised of an anion and organic cation, which are liquid at their temperature of use. Because they are salts, they have effectively zero vapor pressure, thus eliminating odors and reducing the likelihood of contaminating the purified air. They are generally nontoxic and have sufficient stability to resist deterioration. Ionic liquids generally contain relatively large organic cations (quaternary ammonium or phosphonium compounds) and any of a variety of anions, both of which can be tailored to obtain desired characteristics. Ionic liquids can both physically dissolve carbon dioxide and have specific chemical interactions with it. As a class, almost every ionic liquid is water soluble and hygroscopic, meaning that they will absorb moisture from the air, but due to their negligible volatility, the water can be removed by evaporation either by elevating the temperature or reducing the water partial pressure. Because a very large number of ionic liquids exist, and both the cation and the anion can be tailored to obtain desired characteristics, this class of compounds has flexibility as the liquid absorbent for a carbon dioxide removal system with ability to remove contaminants.

Ionic liquids suitable for use in this invention comprise those with melting points below 0° C., low vapor pressure, and with capacity for carbon dioxide, at 30 deg. C and in the presence of 3.8 torr carbon dioxide partial pressure, of >1%. Examples of such ionic liquids include 1-ethyl-3-ethylimidazolium acetate, 1-ethyl-3-methylimidazolium trifluoroacetate, 1-butyl -3-methylimidazolium acetate, tributylmethylphosphonium acetate, triethylmethylphosphonium acetate etc. These ionic liquids are hygroscopic and can absorb water as well and carbon dioxide. Therefore, the effective working fluid can, in many cases, comprise a mixture of the ionic liquids specified and water. It may, under some circumstances, be useful to add water to the ionic liquid before contacting with carbon dioxide. This can reduce the carbon dioxide capacity but also reduce the viscosity.

1-butyl-3-methylimidazolium acetate (BMIM Ac) has a high CO2 capacity and well understood physical properties.

Figure 4:
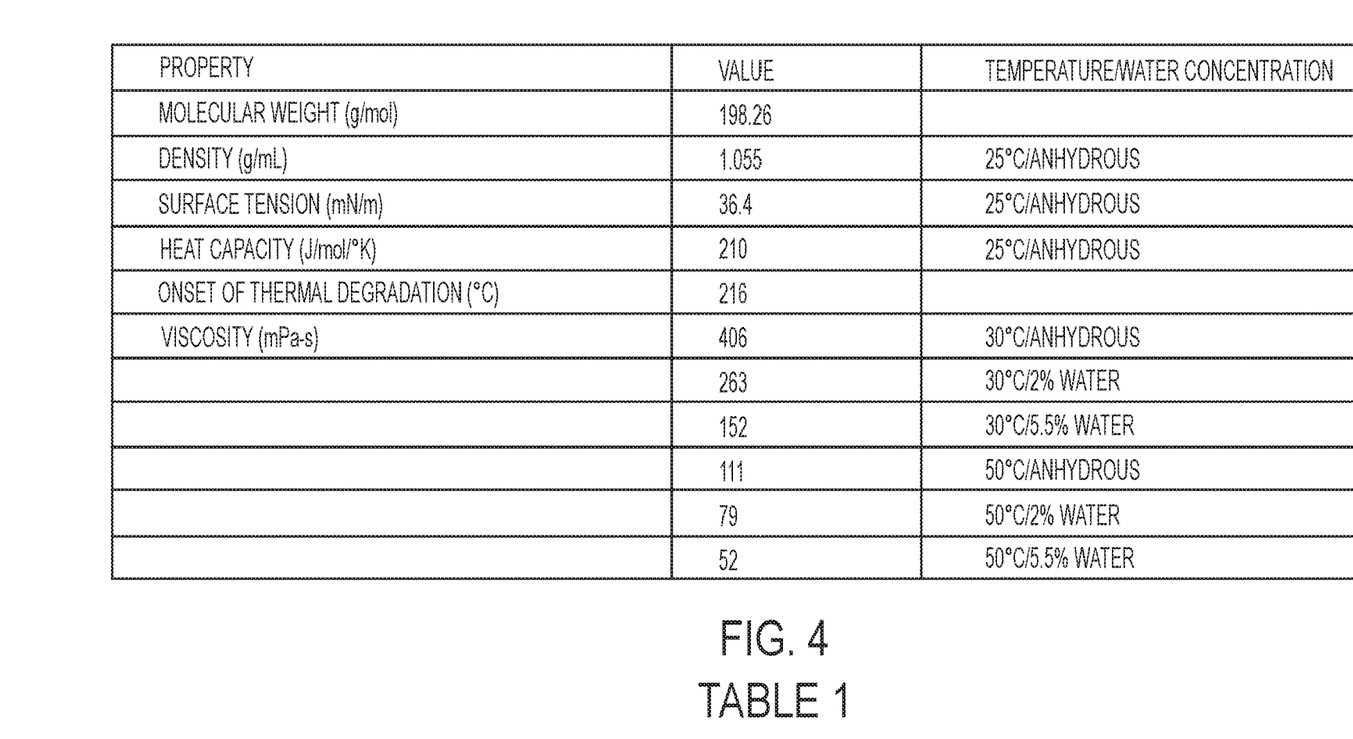
FIG. 4 is a table of properties for BMIM Ac according to an embodiment of the present invention.

BMIM Ac satisfies the basic requirements for an absorbent in a manned vehicle. It is not a hazardous substance or mixture, and has no hazards not otherwise classified. The pH of an aqueous solution is 6.1, and the autoignition temperature is 435° C. The compound is a clear, somewhat viscous liquid, and can be handled readily. Other useful physical properties for BMIM Ac are provided in FIG. 8 (Table 1). The surface tension is similar to that for a polar organic solvent, and the density is similar to that for water. The onset for thermal degradation sets the upper temperature limit for processing, and is comfortably higher than the temperature needed for desorption. The viscosity for this ionic liquid is higher than that of water, but can be reduced either by raising the temperature or water content. In normal use, the ionic liquid absorbs both CO2 and water, and therefore the viscosity values vary in the presence of water. Viscosity strongly affects how well the ionic liquid can be distributed into high surface area droplets or media, and also plays a role in determining mass transfer rates for CO2 adsorption and desorption. Control of viscosity can therefore reduce the weight and volume of the contactor-separator.

Figure 5:
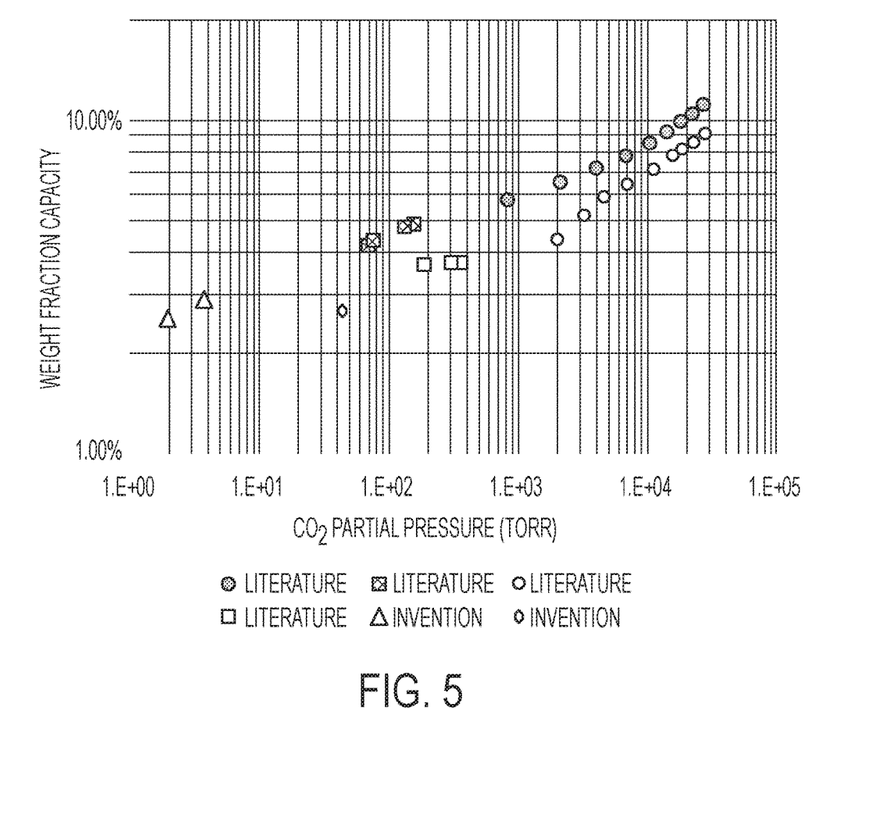
FIG. 5 is a graph of CO2 capacity versus CO2 partial pressure according to an embodiment of the invention.

FIG. 5 shows a smooth relationship between CO2 capacity and CO2 partial pressure for BMIM Ac, referred to as an isotherm curve. The isotherms do not reflect linear dependence of capacity on CO2 partial pressure as described by Henry's law, but instead resemble the isotherms normally observed for adsorption by solid adsorbents. This reflects the fact that, for this ionic liquid, the interaction between the ionic liquid and carbon dioxide is believed to involve formation of a chemical complex. Increasing the temperature has the expected effect of reducing the capacity. Our experimental measurements at CO2 partial pressures of 3.8 torr (5000 ppm) and 2.0 torr (2600 ppm), both with 1.7% water content, are higher than would have been expected at similar water content based on extrapolation of the literature data measured at higher CO2 partial pressures.

Figure 6:
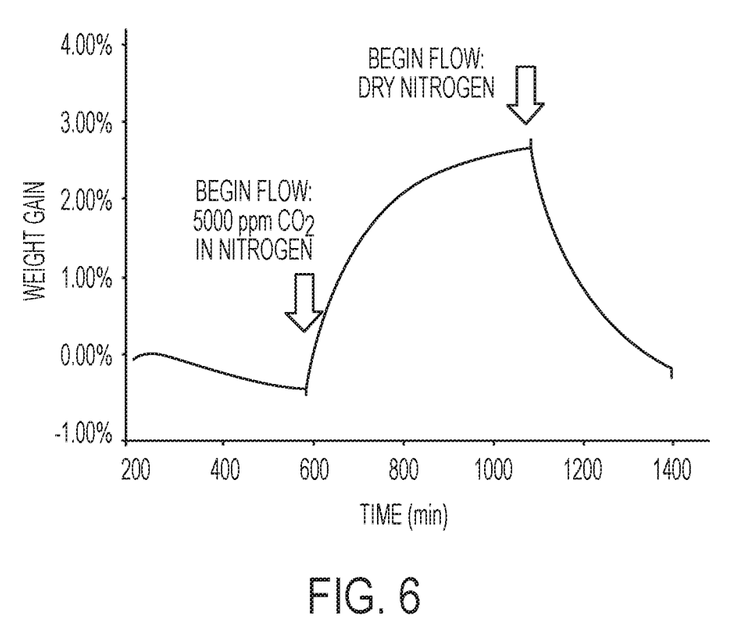
FIG. 6 is a graph of liquid absorbent weight gain v. CO2 absorption time according to an embodiment of the invention.

Regeneration of BMIM Ac can be straight forward with the proper controls. In our initial experiments using thermogravimetric analysis, we found that simply reducing the partial pressure of CO2 was sufficient to desorb CO2 and reverse the weight gain initially obtained—FIG. 6. This process can be accelerated by elevating the temperature, and the partial pressure reduction can be accomplished by lowering the overall pressure as required for desired performance.

Figure 7:
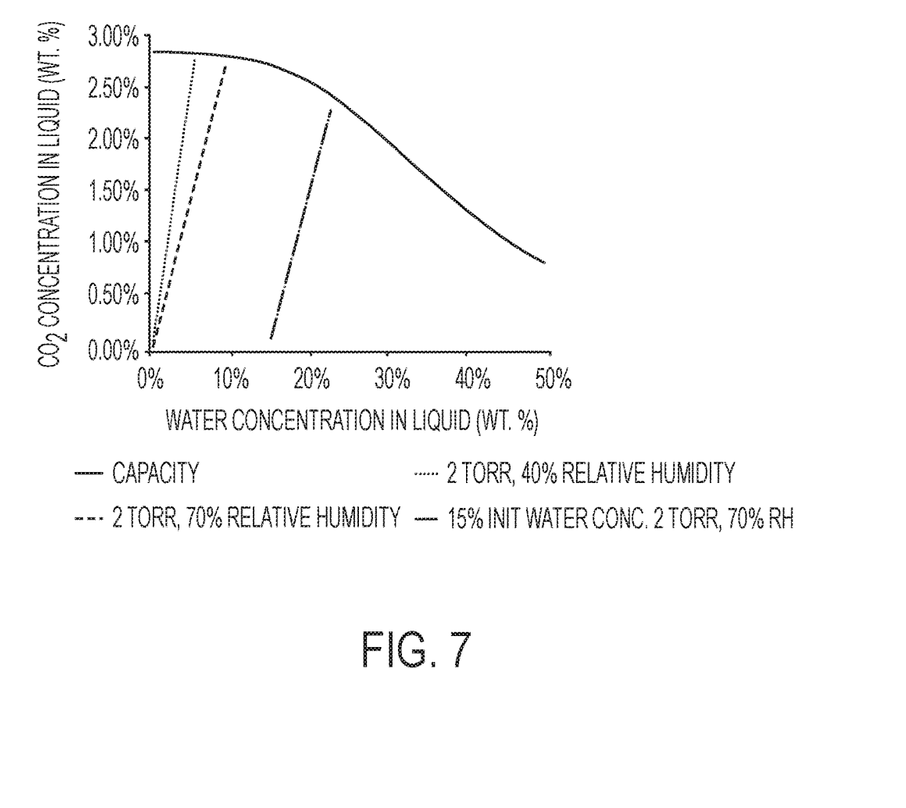
FIG. 7 is a graph of CO2 concentration versus H2O concentration according to an embodiment of the present invention.

In FIG. 7, the predicted carbon dioxide capacity is shown as a function of water content in the ionic liquid, as estimated using a correlation published by S. Baj, T. Krawczyk, A. Dabrowska, A. Siewniak, A. Sobolewski, Korean Journal of Chemical Engineering, 32, 2295-2299 (2015). The remaining dashed and dotted lines in FIG. 7 reflect the concentration of CO2 expected from simultaneous absorption of water and carbon dioxide under various conditions, assuming that 100% of the water and CO2 is absorbed from the feed. The intersection between these lines and the capacity curve estimates the capacity of the ionic liquid under those conditions. Note that, even under worst case conditions, the predicted capacities are not far from the maximum capacity at the indicated CO2 partial pressure. We also learn from FIG. 7 the importance of managing the water concentration in the ionic liquid by appropriate regeneration conditions.

The size of the contactor-separator needed to remove 2.88 g/min CO2 is determined by the capacity of the ionic liquid for CO2 and the rate of mass transfer of CO2 from the gas phase to the liquid phase. The mass transfer from gas phase to liquid phase depends on the mass transfer coefficient and the gas-liquid mass transfer area. The mass transfer coefficient is expected to be dominated by liquid mass transfer, since mass transfer in the gas phase is rapid. Thus, the mass transfer coefficient depends strongly on the characteristics of the ionic liquid, while the surface area depends on characteristics of the contactor-separator.

CO2 diffusivity in the ionic liquid is expected to be a main parameter that defines the overall mass transfer and the process efficiency. The diffusivity of CO2 in air is very high in comparison with diffusion in the ionic liquid, so the main resistance to CO2 mass transfer is in the liquid phase. Addition of small amounts of water into the liquid decrease the viscosity and increase the diffusivity (and can also decrease film thickness on the rotating bed, thus increasing mass transfer). Addition of water also affects the particle size distribution from a spray nozzle; increased water content leads to a smaller particle size distribution. We have shown that the water content in ionic liquid negatively affects the absorption capacity. However, the effect of water dilution on capacity is expected to be smaller than the positive effect of water dilution on liquid phase mass transfer rate via viscosity reduction, and by increasing the air-liquid surface area. In other words, the dilution of the ionic liquids with water that is inevitable because of the affinity of the ionic liquids for water is expected to increase the mass transfer rate (decrease scrubber size) without greatly decreasing the ionic liquid capacity (i.e. increasing the flow rate of ionic liquid).

Similarly, we have shown that this process relies on exposing a large surface area of ionic liquid to the air stream. In addition to mass transfer, heat transfer will also occur. Note that in FIG. 2 we showed that the ionic liquid entering the scrubber is cooled. This is beneficial because it increases the working CO2 loading capacity, but will also have the effect of cooling the air returning to the cabin. Again, by taking advantage of this process, the load on cooling systems elsewhere in the spacecraft is reduced, resulting in weight and power reductions for these systems.

It is estimated that this system will be a low-maintenance, high-reliability system since the ionic liquid system will not have corrosion problem. In addition, the use of a non-volatile sorbent and a centrifugal separator to create artificial gravity would decrease the likelihood of contamination of the cabin air by sorbent, a problem suffered both by current CO2 removal system.

In addition to reducing the launch costs associated with the use of the ionic liquid system, the new system would also reduce the mass of consumables. The direct liquid contact system would not vent to space and would not have a connection to space vacuum. The use of the open-loop CO2 removal systems typically used in short-duration missions has also been considered for long-duration missions due to their simplicity and low size, weight and power. However, these devices would require an even greater launch cost due to consumables. Anderson, M. A., Ewert, M. K., Keener, J. F., Wagner, S. A., Stambaugh, I. C. NASA Report TP-2015-21870, Johnson Space Center, March, 2015 estimated that the use of an open-loop system would require a total of 21 kg/crewmember/day of potable water, oxygen, and the tanks to store them, or a total of about 75,600 kg for a 30 month mission to Mars with 4 crewmembers.

The combination of direct liquid contact and novel ionic liquids can provide an integrated carbon dioxide, humidity and trace contaminant removal system with a significantly lower size, weight and power compared to current systems. This system gains its advantage from the use of ionic liquid as the liquid absorbent. Liquid systems eliminate the mass transfer limitations and plumbing complexities of alternative solid adsorbents, and avoid contamination of the cabin air by the sorbent through the use of ionic liquids, which have zero vapor pressure. In addition to being containable, ionic liquids are flame retardant, non-toxic, and very stable. This sorbent is completely regenerable, without the use of space vacuum or high temperatures, and thus provides NASA with an excellent option for closed-loop CO2 removal on existing and future vehicles.

It should be understood, of course, that the foregoing relates to exemplary embodiments of the invention and that modifications may be made without departing from the spirit and scope of the invention as set forth in the following claims.

We claim:

1. A contaminant removal subsystem, comprising:
a scrubber that includes a housing and a packed bed that is non-rotating relative to the housing;
wherein the scrubber is configured to receive a contaminated air and a clean liquid absorbent, and discharge a cleaned air and a used liquid absorbent;
wherein the cleaned air contains a lower concentration of gas contaminant than the contaminated air;
wherein the used liquid absorbent includes gas contaminant absorbed into clean liquid absorbent;
a stripper downstream, with respect to used liquid absorbent, of the scrubber;
wherein the stripper is configured to desorb gas contaminant from the used liquid absorbent to produce a regenerated liquid absorbent;
a heat exchanger between the scrubber and the stripper; and
a heater directly downstream, with respect to used liquid absorbent, of the heat exchanger and directly upstream, with respect to used liquid absorbent, of the stripper, wherein the heater is configured to heat used liquid absorbent without employing another heater for heat exchange.

2. The subsystem of claim 1, wherein the used liquid absorbent contains a higher concentration of gas contaminant than the cleaned air.

3. The subsystem of claim 1, wherein the used liquid absorbent contains a higher concentration of gas contaminant than the regenerated liquid absorbent.

4. The subsystem of claim 1, wherein the packed bed enables transfer of gas contaminant to clean liquid absorbent, coalescence of droplets of used liquid absorbent, and separation of used liquid absorbent from cleaned air.

5. The subsystem of claim 1, further comprising a clean liquid absorbent storage between the scrubber and the stripper.

6. The subsystem of claim 1, further comprising a centrifugal separator downstream of the packed bed.

* * * * *